3,773,743
PROCESS FOR IMPROVING THE COLOR OF
ZIEGLER OLEFIN POLYMERS
Oliver C. Ainsworth, Jr., Joseph F. Lochary, and Shelton
D. Stain, Jr., Baton Rouge, La., assignors to The Dow
Chemical Company, Midland, Mich.
No Drawing. Filed Feb. 3, 1969, Ser. No. 796,153
Int. Cl. C08f 45/56, 45/58, 45/60
U.S. Cl. 260—94.9 F                    13 Claims

ABSTRACT OF THE DISCLOSURE

Polymers of olefins and/or other ethylenically unsaturated monomers containing metallic catalyst residues are stabilized against discoloration and degradation during and after high temperature processing by contacting the polymer with a hydroxyl compound, such as water, and an organic base, such as triethanol amine, immediately prior to and/or concurrent with high temperature processing of the polymer.

BACKGROUND OF THE INVENTION

This invention relates to a process for deactivating catalytic metal residues often contained in freshly prepared olefin polymers and polymers of other ethylenically unsaturated monomers, and more particularly, to the deactivation of residues of so-called Ziegler catalysts which often cause discoloration and degradation of the polymer during high temperature processing.

In recent years, high density, high molecular weight olefin polymers made by the means of a catalyst containing an organo-metallic compound and a transition metal compound—so-called Ziegler catalyst—have been found to be quite useful in a wide range of applications. This broad utility is due to the unique combination of properties of these olefin polymers, for example, chemical inertness, durability, moisture vapor impermeability, stiffness, etc. This combination of properties is especially useful in the preparation of bottles for the storage of chemicals, wire jacketing materials and the like. Conventionally such articles are often shaped by extrusion in a screw-type extruder which comprises a plastic material feed section, one or more screws enclosed in an extruder barrel, a mixing section at the end of the one or more screws, and a forming die beyond the mixing section. In such an extrusion apparatus, the polymer in a dry, granular form is fed from a hopper to the feed section of the extruder and, forwarded by the flights of the screws, passes through the extruder barrel wherein it is heated and mechanically worked to plastify the polymer before it emerges from the forming die under high pressure. Alternatively such olefin polymers are also shaped by other high temperature methods such as in injection molding, roll milling and compression molding, etc.

The olefin polymers prepared in the presence of Ziegler catalysts have incorporated in them appreciable amounts of the catalysts or residues thereof. Unfortunately, these catalysts or their residues upon exposure to the high temperatures which normally occur during extrusion or other high temperature processing impart certain undesirable characteristics to the polymers, for example, the polymers tend to become darker than is desirable due to the presence of the catalyst or their residues.

It is well known to remove a portion of these catalysts and their residues prior to extrusion by leaching the reaction product of polymer and catalyst with alcohols, aqueous acid, water and the like. Such treatments usually produce white polymers initially, but a yellow or tan color returns when the polymers are subjected to molding and/or heating operations. In order to avoid this undesirable color formation, it is usually necessary to use a second or even a third clean-up procedure requiring the use of large quantities of deactivating materials and the like. Furthermore it has also been the practice in the art to dry the after-treated polymer prior to fabrication. Because they usually must be repeated several times in order to obtain a polymer having acceptable color upon exposure to heat, such cleanup procedures are both expensive and time consuming.

In view of the problems relating to removing or deactivating catalytic metal residues in olefin polymers and the deleterious effects of their presence, it would be highly desirable to provide an inexpensive and expedient method for deactivating such residues.

SUMMARY OF THE INVENTION

The present invention is an improvement in a process for working at high temperatures an olefin polymer containing up to about 500 p.p.m. of metallic catalyst residues of a kind which characteristically discolors upon exposure to high temperatures. Accordingly, the improvement comprises the steps of (1) intimately contacting the olefin polymer with from about 0.5 to about 1.5 weight percent based on the polymer of a hydroxyl compound, hereinafter described in detail, and from about 50 to about 2500 p.p.m. based on the polymer of an organic base, also described hereinafter, and (2) processing the polymer containing the hydroxyl compound and organic base at a temperature above the softening point of the polymer whereby the color of the processed polymer is improved. The improvement of this invention is particularly useful in the fabrication of articles of polymers typically containing small amounts of color-producing metallic catalyst residues.

DESCRIPTION OF THE PREFERRED EMBODIMENTS

The practice of the present invention requires (1) intimately contacting a normally solid, olefin polymer containing up to about 500 p.p.m. of metallic catalyst residues with an organic base and a hydroxyl compound and (2) processing the olefin polymer at high temperatures while it still contains the organic base and hydroxyl compound.

Organic bases which are suitably employed in the process of this invention have boiling points of at least 100° C. and are capable of accepting a proton in water. By the term "organic base" is meant a Lewis base which contains a lipophilic organic group having at least 2 carbon atoms. The lipophilic group imparts to the organic base the degree of solubility in the polymer which is required to assure an intimate contact of the base with the polymer. Examples of suitable organic bases include the alkyl and aryl amines having at least two carbon atoms and a boiling point above 100° C., e.g., n-amylamine, n-hexylamine, n-heptylamine, sec-heptylamine, n-octylamine, di-n-propylamine, tri-n-propylamine, cyclohexylamine, benzylamine, α-phenylethylamine, aniline, methylaniline, o-toluidine, diheptylamine, dihexylamine, diisobutylamine, dimethyl pentylamine, dioctylamine, diphenyl methylamine and the like; alkyl and aryl polyamines having at least 2 carbon atoms, e.g., ethylenediamine,
1,2-propanediamine,
trimethylenediamine,
tetramethylenediamine,
N-isopropyl-N'-phenyl-p-phenylenediamine,
N-sec-butyl-N'-phenyl-p-phenylenediamine,
N-sec-pentyl-N'-phenyl-p-phenylenediamine,
N-sec-hexyl-N'-phenyl-p-phenylenediamine,
N-sec-heptyl-N'-phenyl-p-phenylenediamine and the like; the alkanol amines, e.g., ethanolamine, diethanolamine, triethanolamine, ethyl diethanolamine, dipropanolamine; and other amines, e.g., morpholine and the like.

Suitable organic bases also include various salts of metals of Groups I–IV of the Periodic Chart and carboxylic acids having at least 2 carbon atoms, e.g., acetic, propionic, butyric, valeric, caproic, ricinoleic, lauric, myristic, palmitic, stearic, oleic, linoleic, benzoic and the like. Particularly suitable are, for example, the stearates, oleates, ricinoleates, palmitates and myristates of lithium, calcium, strontium, barium, magnesium, zinc, cadmium, aluminum, tin, lead and bismuth. Of these, the calcium, lithium, barium, cadmium and lead salts are preferred, with the calcium salts being especially preferred, for example, calcium stearate.

Other operable organic bases include the trialkyl phosphites, e.g., tridecyl phosphite, tristearyl phosphite, ethyl dioctyl phosphite and the like. Also included among the operable organic bases are the metal alkoxides wherein the alkoxide contains at least 2 carbon atoms, for example, aluminum ethoxide, sodium propoxide, potassium isobutoxide, calcium octoxide and the other alkoxides of other metals, particularly the alkali and alkaline earth metals.

Hydroxyl compounds which are suitable for the purposes of this invention are compounds represented by the general formula ROH wherein R is hydrogen or an alkyl group having from 1 to 12 carbon atoms. Water is preferred and when used it optionally contains materials such as surfactants, wetting agents, electrolytes, antioxidants and the like. Water is added in a liquid sate or in the form of a hydrate, especially the hydrate of an organic base as hereinbefore described. Aliphatic alcohols which are also suitable hydroxyl compounds include methanol, ethanol, propanol, n-butanol and other aliphatic alcohols having 1 to 12 carbon atoms.

The process of this invention can be employed to stabilize a variety of polymers against discoloration and degradation resulting form high temperature processing. In general, such polymers include the olefin polymers prepared by the so-called low pressure polymerization process, i.e., a process operating at pressures below 500 atmospheres and using a stereospecific catalyst system, e.g., a Ziegler catalyst. Examples of olefin polymers suitably treated according to this invention include the homopolymers and copolymers of ethylene, propylene, butene-1, isobutylene, pentene-1, 2-methylbutene-1, 3-methylbutene-1, hexene-1, heptene-1, octene-1, 4-methylpentene-1 and the like.

Stereospecific catalysts are well described in the literature. They are generally species or modifications of the so-called Ziegler or Natta catalysts which generally comprise one or more metals in free form or in chemically combined form. For example, the catalyst systems described by Dr. Karl Ziegler in U.S. Patents 3,113,115 and 3,257,332 contain a reducing component, e.g., a metal, an alloy of metals, a metal hydride or an organometallic compound wherein the metal is selected from Groups I–A, II–A and III–A, inclusive, of the Periodic Table ("Handbook of Chemistry and Physics," 42nd ed., 1960, pp. 448–449, Chemical Rubber), and a reducible component, e.g., a compound of a metal of Groups IV–B, V–B and VI–B, inclusive, of the Periodic Table referred to above. An especially useful catalyst system comprises triisobutyl aluminum and titanium tetrachloride.

Before carrying out the improved process of this invention, the reaction mixture resulting from low pressure polymerization as described above is treated to deactivate the catalyst system, usually by contact with a polar compound such as an alcohol, water and/or hydrochloric acid and is subsequently worked to remove at least a substantial part of the resulting catalyst residues. The resulting worked polymer generally contains up to about 500 p.p.m. of catalyst residue. It is polymers containing these amounts of polymer which are effectively treated by the process of this invention.

In carrying out the improved process of this invention the olefin polymer containing up to 500 p.p.m. of metallic catalyst residue is intimately contacted and compounded with from about 50 to about 2500 p.p.m. of a suitable organic base based on the polymer and from about 0.5 to about 1.5 weight percent of a specified hydroxyl compound also based on the polymer.

The amount of water or other suitable hydroxyl compound added is important since maximum improvement in the color of the processed polymer occurs when from about 0.7 to about 1.5 weight percent based on the polymer is added. At amounts of water above 1.5 weight percent, color is not significantly improved and amounts in excess of 1.5 weight percent usually cause problems in high temperature processing; for example, in extrusion the excess water causes bubbles and/or pockmarks to be formed on the extruded polymer. A minimum amount of about 0.5 weight percent of water or other suitable hydroxyl compound is required to achieve acceptable color improvement.

The amount of organic base required is dependent at least in part on the concentration of catalyst residues in the polymer. However, as a general rule, the organic base is added in amounts from about 50 p.p.m. to about 2500 p.p.m. based on the weight of the polymer. In cases in which the concentration of catalyst residues is less than about 100 p.p.m., it is preferable to add from about 50 to about 250 p.p.m. of the organic base. In any case significant color improvement is not observed when amounts greater than about 2500 p.p.m. are added. In some instances addition of a large amount of the organic base is apt to have deleterious effects on the polymer.

The hydroxy compound, usually water, and organic base may be mixed together prior to contact with the polymer or may be added separately to the polymer. In most instances, however, it is preferable to mix the ingredients prior to contact with the polymer, thereby assuring that both kinds of additives will be present in the polymer during high temperature processing.

The polymer is adequately contacted with the hydroxyl compound and organic base by any conventional method used to blend or mix additives with normally solid, organic polymers. For example, the hydroxyl compound and organic base may be first dry blended with the polymer in a powder blender and the mixture thereafter mechanically worked at a high temperature, e.g., by mlling on a two roll mill, by mixing in a Banbury mixer or by extrusion. Whichever method is chosen to intimately contact the polymer with the hydroxyl compound and organic base, it is desirable that the two components be thoroughly dispersed in the polymer prior to heating the polymer above its softening point.

In the process of this invention it is required that the hydroxyl compound and the organic base be present in the polymer during high temperature processing, thereby assuring that essentially all catalyst residues are deactivated. Furthermore, it is found that the deactivaion of caalyst residues is actually more complete when the polymer containing the hydroxyl compound and the organic base is processed at high temperatures ranging from about 190° C. to about 250° C., especially from about 230° C. to about 250° C., than at temperatures below 190° C. High temperature processing is therefore preferably carried out by feeding the polymer containing specific amounts of the hydroxyl compound and organic base into a polymer processing apparatus operating at temperatures above 190° C. Examples of suitable polymer processing apparatus include extruders, Banbury mixers, roll milling devices, injection and compression molding machines and the like.

In one embodiment of the invention a mixture of from about 0.5 to about 1.5 weight percent of water and from about 50 p.p.m. to about 2500 p.p.m. of the organic base is added to the polymer during extrusion of the polymer in a screw-type extruder, said percentages and parts being based on the amount of polymer entering the extruder barrel. Ideally the mixture is introduced into the extruder and contacts the polymer at a point between the feed section and screw mechanism, preferably at a point immediately prior to the point where the polymer enters the flights of the extruder screw. In another embodiment the mixture is introduced into a screw-type extruder through one or more liquid inlet means placed along the barrel of the extruder and contacts the polymer after it enters the flights of the extruder screw and before it passes into the mixing section. The embodiment first described above is usually advantageous in that the dispersion of the additive mixture in and with the polymer is more thorough prior to exposure of the polymer to high temperature and the effect of preventing discoloration is consequently substantially greater.

several of the samples are contacted with different amounts of a variety of organic bases. The Milner color is determined for each extruded sample and is recorded in Table I.

For the purposes of comparison and to particularly point out the advantages of this invention several samples ($B_x$) of the polyethylene are processed according to the procedure used above except that no water is introduced into the extruder. The Milner color for each of these extruded samples is again determined and recorded in Table I.

Also for the purposes of comparison a control sample (C) is extruded under the conditions described in Example 1 except that no organic base or water is introduced into the extruder. The Milner color for the extruded sample is determined and recorded in Table I.

TABLE I

| Sample No. | Organic base | Amount of organic base added, p.p.m.[a] | Amount of water added, wt. percent [b] | Milner color [c] |
|---|---|---|---|---|
| 1 | Calcium stearate | 200 | 1.4 | 86.5 |
| 2 | do | 2,000 | 1.4 | 89.6 |
| 3 | Aluminum stearate | 2,000 | 1.4 | 86.2 |
| 4 | Lauryl diethanolamine | 2,000 | 1.4 | 87.4 |
| 5 | Tristearyl phosphite | 200 | 1.4 | 85.8 |
| C [d] | | 0 | 0 | 63.1 |
| $B_1$ [d] | Calcium stearate | 200 | 0 | 71.2 |
| $B_2$ [d] | do | 2,000 | 0 | 81.5 |
| $B_3$ [d] | Aluminum stearate | 2,000 | 0 | 81.1 |
| $B_4$ [d] | Lauryl diethanolamine | 2,000 | 0 | 83.8 |
| $B_5$ [d] | Tristearyl phosphite | 200 | 0 | 73.2 |

[a] Based on weight of polymer added to the feed section.
[b] Based on weight of polymer added to the feed section.
[c] Milner color = $G - 1/2\ y_3$ where $G$ is the percent of reflected light from a source of light having wavelengths covering the entire visible range and $y$ is the percent of reflected light at 700 m$\mu$ minus the percent of reflected light at 500 m$\mu$ plus the percent reflected light at 433 m$\mu$. $G$ and $y_3$ were determined colorimetrically on a Model D "color eye" colorimeter made by Instrument Laboratories, Inc. A Milner color of 85.0 or above is regarded as acceptable color in the fabrication of articles from polymers containing less than 100 p.p.m. of Ziegler catalyst residues.
[d] Not an example of the invention.

The following examples are given for the purposes of illustrating the invention and are not to be construed as limiting in scope. In the specification and claims all parts and percentages are by weight unless otherwise indicated.

EXAMPLE 1

A polyethylene is prepared by a low pressure polymerization process using hexane as an organic liquid vehicle and a catalyst consisting of titanium trichloride and triisobutyl aluminum in a mole ratio of 1:1. The resulting polyethylene-hexane slurry is passed through a steam distillation system to remove the hexane from the polyethylene and to remove a substantial portion of the catalyst and their residues. The resultant polyethylene containing from 30 to 50 percent water is dried to less than 0.1 percent moisture. Several samples are taken from the polyethylene and are found to contain 76 p.p.m. of titanium residues. The Milner color of the samples at this point in the procedure is 72.6. Each sample is then charged to the feed section of a Werner and Pfleiderer ZSK Kneader-Compounder (extruder) operating at temperatures between 190° and 250° C. As a particular sample passes into extruder from the feed section, a mixture of water and an organic base is introduced into the extruder at a point such that the mixture thoroughly contacts the polymer prior to entry of the polymer into the flights of the screws of the extruder. For the purposes of comparison

EXAMPLE 2

A polyethylene is prepared by a low pressure polymerization process using hexane as an organic liquid vehicle and catalyst consisting of a 1:1:1 mole ratio respectively of phenyl magnesium bromide, titanium tetrachloride and triisobutyl aluminum. The resulting polyethylene-hexane slurry is passed through a steam distillation system to remove hexane from the polyethylene and to deactivate a substantial portion of the catalyst. The polymer is digested in n-propanol to remove substantially all of the catalyst and residues thereof from the polymer. The resultant polyethylene is dried to less than 0.1 percent moisture, and several samples containing 14 p.p.m. of titanium residues, 10 p.p.m. of aluminum residues, 15 p.p.m. of phenyl magnesium bromide residues and 5 p.p.m. of bromine are taken from the digested polyethylene product. The polyethylene samples have a Milner color of 79.3. The samples are then processed according to the procedure of Example 1 and their Milner colors are determined and recorded in Table II.

For the purposes of comparison several samples ($B_x$) are processed according to the above procedure except that no water is introduced into the extruder. The Milner colors of these samples are determined and also recorded in Table II. Also a control sample (C) is extruded under the above condition except that no organic base or water is added. The Milner color thereof is shown in Table II.

TABLE II

| Sample No. | Organic base | Amount of organic base added, p.p.m.[a] | Amount of water added, wt. percent [b] | Milner color [c] |
|---|---|---|---|---|
| 1 | Calcium stearate | 2,000 | 0.7 | 86.5 |
| 2 | do | 2,000 | 1.4 | 88.3 |
| 3 | Calcium stearate / Tristearyl phosphite | 2,000 / 200 | 1.4 | 89.5 |
| 4 | Aluminum stearate | 2,000 | 1.4 | 86.5 |
| 5 | Aluminum stearate / Tristearyl phosphite | 2,000 / 200 | 1.4 | 89.5 |
| 6 | Lauryl diethanolamine | 2,000 | 1.4 | 86.2 |
| C [d] | | 0 | 0 | 51.5 |
| $B_1$ [d] | Aluminum stearate | 2,000 | 0 | 84.1 |
| $B_2$ [d] | Lauryl diethanolamine | 2,000 | 0 | 83.7 |

See footnotes (a) (b) (c) (d) bottom of Table I.

EXAMPLE 3

Several polyethylene samples are prepared according to procedure described in Example 1 except that the catalyst consists of titanium tetrachloride and triisobutyl aluminum in a mole ratio of 1:1.2 and some of said samples contain larger amounts of Ziegler catalyst residues. Each sample is blended with 150 p.p.m. of 2,6-di-tert-butyl-4-methylphenol antioxidant and then charged to the feed section of an extruder of type used in Example 1. A mixture of lauryl diethanolamine and water is introduced into the extruder in the manner described in Example 1 and the sample of polyethylene is extruded at 250° C. The Milner color of each extruded sample is determined and shown in Table III. The Milner color of a standard sample containing 300 p.p.m. of titanium residues before extrusion is 46.3.

TABLE III

| Sample No. | Catalyst residues, p.p.m. | Lauryl diethanol amine, p.p.m. [a] | Water, wt. percent [b] | Milner color [c,d] |
|---|---|---|---|---|
| 1 | 300 | 500 | 1.4 | 83.0 |
| 2 | 226 | 500 | 1.4 | 86.2 |
| 3 | 74 | 500 | 1.4 | 87.1 |
| 4 | 73 | 500 | 1.4 | 86.5 |

See footnotes (a)(b)(c) bottom of Table I.
[d] A Milner color above 80 is considered acceptable in the extrusion of polymers containing more than 250 p.p.m. of catalyst residues.

Following the procedure described in Example 1 several samples of various polyolefins containing up to 500 p.p.m. of catalyst residues are treated with mixtures of (a) one of the following alcohols: ethanol, propanol, methanol and butanol and (b) one of the following organic bases: aniline, potassium oleate, aluminum ethoxide, tridecyl phosphite and the like. The resulting extruded samples have Milner colors substantially improved over the same or similar samples treated with the respective bases alone.

What is claimed is:

1. In a process for working at high temperatures an olefin polymer prepared by a low pressure polymerization process which is carried out in the presence of a stereospecific, metallic Ziegler-Natta polymerization catalyst and containing up to about 500 p.p.m. of stereospecific, metallic polymerization catalyst residues of a kind which characteristically discolor upon exposure to said high temperatures, the improvement which comprises the steps of (1) intimately contacting the olefin polymer with from about 0.5 to about 1.5 weight percent based on the polymer of a hydroxyl compound represented by the formula ROH wherein R is selected from the group consisting of hydrogen and alkyl radicals having from 1 to 12 carbon atoms and from about 50 to about 2500 p.p.m. based on the polymer of an organic Lewis base having at least two carbon atoms and a boiling point at atmospheric pressure of at least 100° C., said base being capable of accepting protons from water, and (2) extruding the polymer while it still contains the hydroxyl compound and organic base at a temperature above the softening point of the polymer whereby the color of the extruded polymer is improved.

2. The improvement according to claim 1 which comprises (1) intimately contacting an olefin polymer selected from the group consisting of polyethylene, polypropylene, copolymer consisting of ethylene and propylene, and copolymer consisting of ethylene and butene-1 prepared in the presence of metallic catalyst containing a titanium chloride and trialkyl aluminum, said olefin polymer containing up to 500 p.p.m. of residues of said catalyst, with (a) from about 0.5 to about 1.5 weight percent of water based on said polymer and (b) from about 50 to about 2500 p.p.m. based on said polymer of an organic Lewis base having at least 2 carbon atoms and a boiling point above 100° C. and selected from the group consisting of alkyl amine, aryl amine, alkyl polyamine, aryl polyamine, alkanol amine, the stearates, oleates, ricinoleates, palmitates and myristates of lithium, calcium, strontium, barium, magnesium, zinc, cadmium, aluminum, tin, lead and bismuth, trialkyl phosphite, and ethoxides, propoxides, and butoxides of aluminum, sodium, potassium, and calcium and (2) extruding the polymer containing the water and organic base at a temperature above the softening point of the polymer whereby the color of the extruded polymer is improved.

3. The improvement according to claim 1 wherein the organic base is an alkanol amine.

4. The improvement according to claim 3 wherein the alkanol amine is lauryl diethanol amine.

5. The improvement according to claim 1 wherein the organic base is a salt of a metal selected from the group consisting of the metals of Groups I, II, III and IV of the Periodic Chart and a carboxylic acid having at least 2 carbon atoms.

6. The improvement according to claim 5 wherein the organic base is calcium stearate.

7. In a process for working at high temperatures an olefin polymer prepared by a low pressure polymerization process which is carried out in the presence of a Ziegler catalyst and containing up to about 500 p.p.m. of a residue of said Ziegler catalyst at temperatures which characteristically cause said residue to discolor, the improvement which comprises the steps of (1) intimately contacting said olefin polymer with (a) from about 0.5 to about 1.5 weight percent based on said polymer of water and (b) from about 50 to about 2500 p.p.m. based on the polymer of an organic Lewis base having a lipophilic group having at least 2 carbon atoms and a boiling point above 100° C. and (2) extruding the polymer while it still contains said water and said organic base at a temperature above the softening point of said polymer and below the point at which the polymer normally degrades whereby the color of the extruded polymer is improved.

8. The improvement according to claim 7 which comprises (1) intimately contacting an olefin polymer selected from the group consisting of the homopolymers and copolymers of ethylene, propylene, and butene-1 prepared by a low pressure polymerization process which is carried out in the presence of a Ziegler catalyst and containing up to about 500 p.p.m. of residues of said catalyst, with (a) from about 0.5 to about 1.5 weight percent based on said polymer of water and (b) from about 50 to about 2500 p.p.m. based on polymer of an organic Lewis base having a lipophilic group having at least 2 carbon atoms and a boiling point about 100° C. and (2) extruding the polymer while it still contains said water and said organic base at a temperature above the softening point of said polymer and below the point at which the polymer normally degrades whereby the color of the extruded polymer is improved.

9. The improvement according to claim 7 which comprises (1) intimately contacting an olefin polymer selected from the group consisting of polyethylene, polypropylene, copolymer consisting of ethylene and propylene and copolymer consisting of ethylene and butene-1 prepared in the presence of metallic catalyst selected from the group consisting of titanium tetrachloride and trialkyl aluminum, titanium trichloride and trialkyl aluminum, and phenyl magnesium bromide, titanium tetrachloride and trialkyl aluminum, said olefin polymer containing up to 500 p.p.m. of residues of said catalyst, with (a) from about 0.5 to about 1.5 weight percent based on said polymer of water and (b) from about 50 to about 2500 p.p.m. based on said polymer of an organic Lewis base selected from the group consisting of alkyl amine, aryl amine, alkyl polyamine, aryl polyamine, alkanol amine, morpholine, salts of metals of Groups I–IV and carboxylic acids, trialkyl phosphites and metal alkoxides and (2) extruding the polymer while it still contains said water and said organic base at a temperature in the range of from about 190° C. to about 250° C. whereby the color of the extruded polymer is improved.

10. The improvement according to claim 7 which comprises (1) intimately contacting polyethylene prepared in the presence of metallic catalyst selected from the group consisting of titanium tetrachloride, titanium trichloride, triisobutyl aluminum and phenyl magnesium bromide, said olefin polymer containing up to about 500 p.p.m. of residues of said catalyst, with (a) from about 0.5 to about 1.5 weight percent based on said polymer of water and (b) from about 50 to about 2500 p.p.m. based on said polymer of an organic Lewis base selected from the group consisting of calcium stearate, aluminum stearate, lauryl diethanolamine, and tristearyl phosphite and (2) extruding the polymer while it still contains said water and said organic base at a temperature in the range of from about 190° C. to about 250° C. whereby the color of the extruded polymer is improved.

11. In a process for working at high temperatures an olefin polymer prepared by a low pressure polymerization process which is carried out in the presence of a stereospecific, metallic Ziegler-Natta polymerization catalyst and containing up to about 500 p.p.m. of stereospecific, metallic polymerization catalyst residues of a kind which characteristically discolor upon exposure to said high temperatures, the improvement which comprises the steps of (1) intimately contacting the olefin polymer with from about 0.5 to about 1.5 weight percent based on the polymer of a hydroxyl compound represented by the formula ROH wherein R is selected from the group consisting of hydrogen and alkyl radicals having from 1 to 12 carbon atoms and from about 50 to about 2500 p.p.m. based on the polymer of an organic Lewis base having at least two carbon atoms and a boiling point at atmospheric pressure of at least 100° C., said base being capable of accepting protons from water, and (2) molding the polymer while it still contains the hydroxyl compound and organic base at a temperature above the softening point of the polymer whereby the color of the molded polymer is improved.

12. In a process for working at high temperatures an olefin polymer prepared by a low pressure polymerization process which is carried out in the presence of a stereospecific, metallic Ziegler-Natta polymerization catalyst and containing up to about 500 p.p.m. of stereospecific, metallic polymerization catalyst residues of a kind which characteristically discolor upon exposure to said high temperatures, the improvement which comprises the steps of (1) intimately contacting the olefin polymer with from about 0.5 to about 1.5 weight percent based on the polymer of a hydroxyl compound represented by the formula ROH wherein R is selected from the group consisting of hydrogen and alkyl radicals having from 1 to 12 carbon atoms and from about 50 to about 2500 p.p.m. based on the polymer of an organic Lewis base having at least two carbon atoms and a boiling point at atmospheric pressure of at least 100° C., said base being capable of accepting protons from water, and (2) mixing the polymer while it still contains the hydroxyl compound and organic base at a temperature above the softening point of the polymer whereby the color of the mixed polymer is improved.

13. In a process for working at high temperatures an olefin polymer prepared by a low pressure polymerization process which is carried out in the presence of a stereospecific, metallic Ziegler-Natta polymerization catalyst and containing up to about 500 p.p.m. of stereospecific, metallic polymerization catalyst residues of a kind which characteristically discolor upon exposure to said high temperatures, the improvement which comprises the steps of (1) intimately contacting the olefin polymer with from about 0.5 to about 1.5 weight percent based on the polymer of a hydroxyl compound represented by the formula ROH wherein R is selected from the group consisting of hydrogen and alkyl radicals having from 1 to 12 carbon atoms and from about 50 to about 2500 p.p.m. based on the polymer of an organic Lewis base having at least two carbon atoms and a boiling point at atmospheric pressure of at least 100° C., said base being capable of accepting protons from water, and (2) milling the polymer while it still contains the hydroxyl compound and organic base at a temperature above the softening point of the polymer whereby the color of the milled polymer is improved.

References Cited

UNITED STATES PATENTS

| 3,520,866 | 7/1970 | Racskai | 260—93.7 |
| 3,219,622 | 11/1965 | Luciani et al. | 260—45.95 |
| 3,248,351 | 4/1966 | Roy | 260—23 |
| 3,265,649 | 8/1966 | Faltings et al. | 260—23 |
| 3,299,027 | 1/1967 | Luciani et al. | 260—93.7 |
| 3,308,105 | 3/1967 | Hoyt et al. | 260—88.2 |

JOSEPH L. SCHOFER, Primary Examiner

W. F. HAMROCK, Assistant Examiner

U.S. Cl. X.R.

260—45.7 P, 45.9, 45.95, 88.25, 93.7, 94.9 GD, 96 R

UNITED STATES PATENT OFFICE
CERTIFICATE OF CORRECTION

Patent No. 3,773,743　　　　　　　　Dated　November 20, 1973

Inventor(s)　Oliver C. Ainsworth, Jr. et al

It is certified that error appears in the above-identified patent and that said Letters Patent are hereby corrected as shown below:

In Column 3, line 36, the word "form" should read --from--.

In Column 4, line 55, the word "deactivaion" should read --deactivation--.

In Column 4, line 56, the word "caalyst" should read --catalyst--.

In Column 5, line 45, "tillation system to remove the hexane from the polyethyl-" should be placed after line 47 so that starting with line 44, the paragraph reads:

--and a catalyst consisting of titanium trichloride and tri-isobutyl aluminum in a mole ratio of 1:1. The resulting polyethylene-hexane slurry is passed through a steam distillation system to remove the hexane from the polyethylene and to remove a substantial portion of the catalyst--

Column 6, in Table I, last column, under the heading Milner color$_c$, the 7th, 8th and 9th figures are in error. The column should read as follows:

86.5
　　　　　　　89.6
　　　　　　　86.2
　　　　　　　87.4
　　　　　　　85.8
　　　　　　　63.1
　　　　　　　71.5
　　　　　　　81.2
　　　　　　　81.2
　　　　　　　83.8
　　　　　　　73.1

Signed and sealed this 25th day of June 1974.

(SEAL)
Attest:

EDWARD M. FLETCHER, JR.
Attesting Officer

C. MARSHALL DANN
Commissioner of Patents